US012580303B2

(12) United States Patent
Gu et al.

(10) Patent No.: US 12,580,303 B2
(45) Date of Patent: Mar. 17, 2026

(54) NFC ANTENNA FOR HANDHELD DEVICE AND HANDHELD DEVICE

(71) Applicant: Shanghai Sunmi Technology Co., Ltd., Shanghai (CN)

(72) Inventors: Laibing Gu, Shanghai (CN); Zhe Lin, Shanghai (CN); Hui Shu, Shanghai (CN); Xusheng Lu, Shanghai (CN); Baike Li, Shanghai (CN)

(73) Assignee: Shanghai Sunmi Technology Co., Ltd., Shanghai (CN)

( * ) Notice: Subject to any disclaimer, the term of this patent is extended or adjusted under 35 U.S.C. 154(b) by 44 days.

(21) Appl. No.: 18/712,498

(22) PCT Filed: Dec. 9, 2022

(86) PCT No.: PCT/CN2022/138224

§ 371 (c)(1),
(2) Date: May 22, 2024

(87) PCT Pub. No.: WO2023/104208

PCT Pub. Date: Jun. 15, 2023

(65) Prior Publication Data

US 2025/0030152 A1 Jan. 23, 2025

(30) Foreign Application Priority Data

Dec. 10, 2021 (CN) ........................ 202123120906.1

(51) Int. Cl.
*H01Q 7/00* (2006.01)
*H01Q 1/27* (2006.01)

(52) U.S. Cl.
CPC ............... *H01Q 1/273* (2013.01); *H01Q 7/00* (2013.01)

(58) Field of Classification Search
CPC ................................ H01Q 1/273; H01Q 7/00
See application file for complete search history.

(56) References Cited

U.S. PATENT DOCUMENTS 8,888,008 B2 11/2014 Teshima

FOREIGN PATENT DOCUMENTS

CN 102055063 A 5/2011
CN 102474000 A 5/2012
CN 103904424 A 7/2014
(Continued)

*Primary Examiner* — Henry Luong
(74) *Attorney, Agent, or Firm* — Woodard, Emhardt, Henry, Reeves & Wagner, LLP

(57) ABSTRACT

The application discloses an NFC antenna for handheld devices and a handheld device. The NFC antenna includes an antenna base and a coupling coil arranged along the edge of the antenna base. The antenna base integrally includes a first antenna base and two second antenna bases. The first antenna base is arranged on a backside of the handheld device, with two sides bending and extending towards the frontside of the handheld device to form the second antenna bases. The second antenna bases are respectively located on sides of the handheld device and outside the screen assembly of the handheld device. The NFC antenna covers the sides of the handheld device, so that NFC antenna signals at the sides can be sensed at the frontside, thereby NFC cards can be swiped at both the frontside and backside of the handheld device, without occupying space at the frontside.

14 Claims, 2 Drawing Sheets

(56) References Cited

FOREIGN PATENT DOCUMENTS

| | | | | | |
|---|---|---|---|---|---|
| CN | 106663873 | A | * | 5/2017 | ........... H01Q 1/2208 |
| CN | 216251103 | U | | 4/2022 | |
| CN | 115696728 | A | | 2/2023 | |
| KR | 20140025143 | A | * | 3/2014 | ............... H01Q 1/38 |

* cited by examiner

NFC ANTENNA FOR HANDHELD DEVICE AND HANDHELD DEVICE

FIELD OF THE DISCLOSURE

The application relates to the field of NFC antennas, in particular to an NFC antenna for a handheld device and a handheld device.

BACKGROUND

With the development of science and technology and the improvement of people's living standards, handheld devices such as mobile phones have developed into indispensable communication and entertainment tools in people's daily lives. With the continuous development of mobile phones, they are becoming more and more intelligent. The use of mobile phones is no longer limited to conventional uses like making calls and sending text messages. More and more mobile phones are used for entertainment and even office work, which has led to a sharp increase in the demand for large screens.

In order to make it easier for users to hold, current handheld devices such as mobile phones try to expand the screen area without excessively increasing the overall size of the device. As a result, there is no space to arrange NFC antennas on the front side of the device. Currently, the NFC antennas of mobile phones and other handheld devices are generally configured on the backside or under the screen. When the NFC antenna is configured under the screen, due to interferences from screen components or batteries and other devices, the NFC card cannot be read from both sides of the device. The NFC card can for example only be recognized on the back of the handheld device, making it inconvenient to operate in some usage scenarios.

SUMMARY OF THE INVENTION

The purpose of this application is to provide an NFC antenna for a handheld device and a handheld device, so that NFC cards can be swiped on both the frontside and backside without occupying the front space of the handheld device.

The technical solutions provided by this application are as follows.

In one aspect of the present application, an NFC antenna for a handheld device is provided, including: an antenna base, and a coupling coil; wherein, the coupling coil is arranged along an edge of the antenna base, and the antenna base integrally includes: a first antenna base, and two second antenna bases; wherein, the first antenna base is configured to be arranged on a backside of the handheld device, and two sides of the first antenna base in a width direction of the handheld device are respectively bent and extended towards a frontside of the handheld device to form the two second antenna bases, and the two second antenna bases are respectively located on sides of the handheld device and outside a screen assembly of the handheld device.

In some embodiments, a length or lengths of the two second antenna bases along a length direction of the handheld device are greater than or equal to a length of the first antenna base along the length direction of the handheld device.

In some embodiments, a length or lengths of the two second antenna bases along a length direction of the handheld device are smaller than a length of the first antenna base along the length direction of the handheld device.

In some embodiments, a length of one second antenna base along a length direction of the handheld device is greater than or equal to a length of the first antenna base along the length direction of the handheld device, and, a length of the other second antenna base along the length direction of the handheld device is less than the length of the first antenna base along the length direction of the handheld device.

In some embodiments, widths of the two second antenna bases along a thickness direction of the handheld device are respectively greater than 60% of a thickness of the handheld device.

In some embodiments, a distance between a projection of a second antenna base on the frontside of the handheld device and the screen assembly along a width direction of the handheld device is greater than 1 mm.

In some embodiments, the first antenna base includes a ferrite layer and a first flexible circuit layer, and the ferrite layer and the first flexible circuit layer are stacked; and, the second antenna bases are each composed of a second flexible circuit layer, and coils on the second flexible circuit layers are connected to a coil on the first flexible circuit layer to form the coupling coil.

In another aspect of the present application, a handheld device is provided, comprising an NFC antenna for a handheld device according to any above-mentioned embodiments.

In some embodiments, the handheld device further comprises a back cover, wherein, at the sides of the handheld device in a width direction of the handheld device, the back cover is bent towards the sides of the handheld device to cover the NFC antenna.

In some embodiments, the handheld device further comprising a battery, and, the NFC antenna is disposed between the battery and the back cover.

The technical effect of the present application is, by arranging the NFC antenna to cover the sides of a handheld device, it is achieved that at the frontside of the handheld device, the NFC antenna signals at the sides of the handheld device can be sensed, thereby NFC cards can be swiped on both the frontside and backside of the handheld device, without taking up space at the front of the handheld device.

BRIEF DESCRIPTION OF THE DRAWINGS

The application will be further described in detail below in conjunction with the accompanying drawings and specific embodiments.

EXPLANATION OF REFERENCE NUMBERS

10. Antenna base; 11. First antenna base; 12. Second antenna base; 13. Coupling Coil; 20. Handheld device; 21. Back cover; 22. Middle frame; 23. Battery.

DESCRIPTION OF THE ILLUSTRATED EMBODIMENTS

In order to explain the embodiments of the present application or the technical solutions in the prior art more clearly, the drawings needed to be used in the description of the embodiments or the prior art will be briefly introduced below. Obviously, the drawings in the following description are only some embodiments of the present application. For those of ordinary skill in the art, other drawings can be obtained based on these drawings without exerting creative efforts.

In order to make the drawings concise, only relevant parts of the application are schematically shown in each FIG., and they do not represent the actual structure of the product. In addition, in order to make the drawings concise and easy to understand, in some drawings, only one of the components with the same structure or function is schematically illustrated or labeled. In this article, "a" not only means "only one", but can also mean "more than one".

It should be further understood that the wording "and/or" used in the specification and claims of this application includes any and all possible combinations of one or more of the associated listed items.

In this article, it should be noted that, unless otherwise clearly stated and limited, the terms "installation", "connection" and "connection" should be understood in a broad sense. For example, it can be a fixed connection or a detachable connection, or integrated connection; and it can be a mechanical connection or an electrical connection; and it can be a direct connection or an indirect connection through an intermediate medium; and it can be an internal connection between two components. For those of ordinary skill in the art, the specific meanings of the above terms in the present application can be understood in specific situations.

In addition, in the description of the present application, the terms "first", "second", etc. are only used to differentiate the description and cannot be understood as indicating or implying relative importance.

Figure 1:
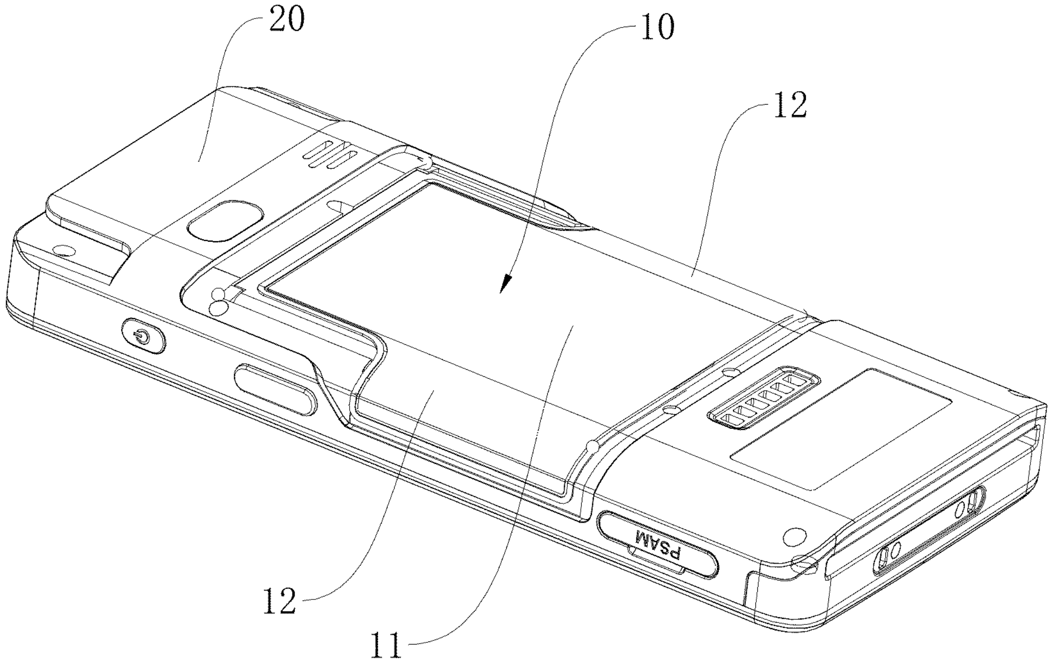
FIG. 1 is a schematic structural diagram of an NFC antenna for a handheld device installed on the handheld device provided by a specific embodiment of the present application.
Figure 2:
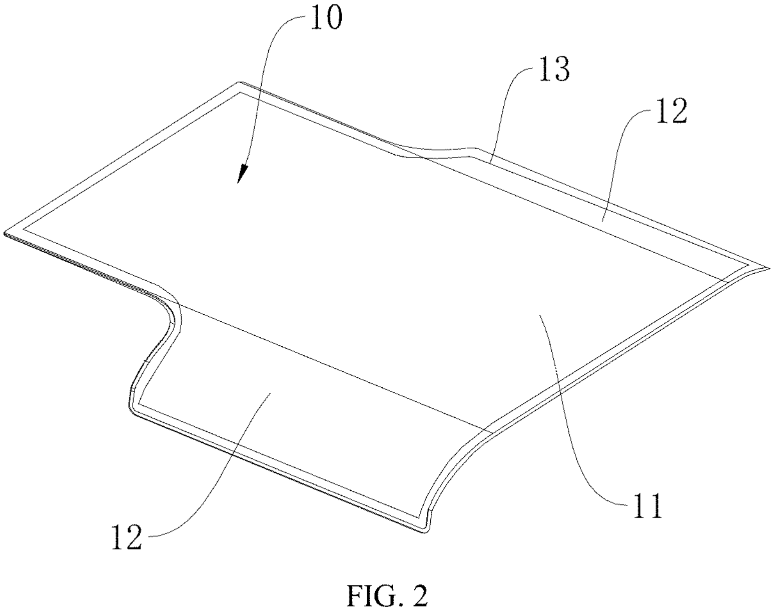
FIG. 2 is a schematic structural diagram of an NFC antenna of a handheld device provided by a specific embodiment of the present application.

In one embodiment of the present application, as shown in FIG. 1 and FIG. 2, an NFC antenna for a handheld device includes an antenna base 10 and a coupling coil 13. The coupling coil 13 is provided along the edge of the antenna base 10. The antenna base 10 includes a first antenna base 11 and two second antenna bases 12 which are integrally provided. The first antenna base 11 is configured to be arranged on a backside of a handheld device 20. On both sides at a width direction of the handheld device 20, the antenna base 10 bends and extends towards the front surface of the handheld device 20 to form the two second antenna bases 12. The two second antenna bases 12 are respectively located on the sides of the handheld device 20 and outside a screen assembly of the handheld device 20.

In this embodiment, the handheld device 20 includes but is not limited to terminal devices such as mobile phones and tablet computers. The frontside of the handheld device 20 is the side where the screen assembly is located. The backside of the handheld device 20 is the side where a back cover 21 is located. The NFC antenna is installed at the backside of the device 20, i.e. installed between the screen assembly of the handheld device 20 and the back cover 21.

As shown in FIG. 2, the first antenna base 11 and the two second antenna bases 12 of this embodiment together form an antenna base 10, and the antenna base 10 and the coupling coil 13 together form a complete NFC antenna. The second antenna bases 12 of the NFC antenna are located on the sides of the handheld device 20 and outside the screen assembly. That is, the projections of the second antenna bases 12 on the frontside of the handheld device 20 do not fall within the screen assembly, but is located on the middle frame of the handheld device 20 or between the side faces of the screen assembly and the middle frame of the handheld device 20, so that the shielding effect of the screen assembly 20 does not affect the second antenna bases 12, so that from the frontside of the handheld device 20, an NFC card is able to sense the NFC antenna signals at both sides of the handheld device 20, without being affected by the screen assembly due to interference, so that NFC cards can be swiped on both the frontside and backside of the handheld device 20 to improve user convenience.

In some embodiments, the lengths of the two second antenna bases 12 along the length direction of the handheld device 20 are greater than or equal to the length of the first antenna base 11 along the length direction of the handheld device 20. The length direction of the handheld device 20 is the up and down direction in FIG. 3. Setting the length of the second antenna bases 12 along the length direction of the handheld device 20 to be greater than or equal to the length of the first antenna base 11 along the length direction of the handheld device 20 can increase the NFC antenna signal strength sensed by the NFC card from the front of the handheld device 20. Therefore, if the spatial arrangement conditions are allowed, the length of the second antenna base 12 can be configured to be greater than or equal to the length of the first antenna base 11.

Figure 3:
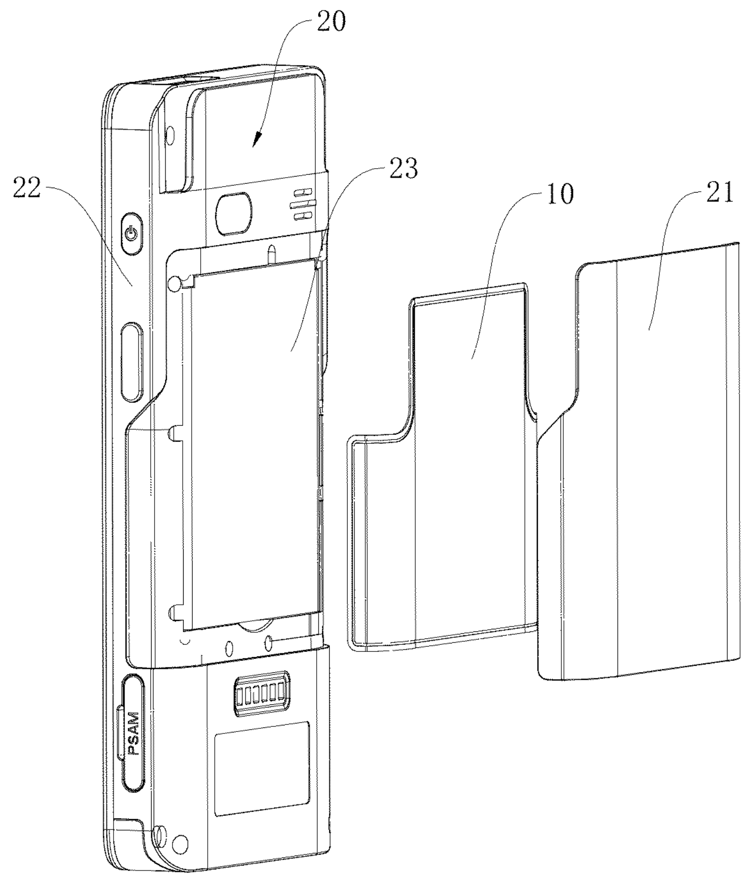
FIG. 3 is an exploded schematic diagram of a handheld device provided by a specific embodiment of the present application.
Figure 4:
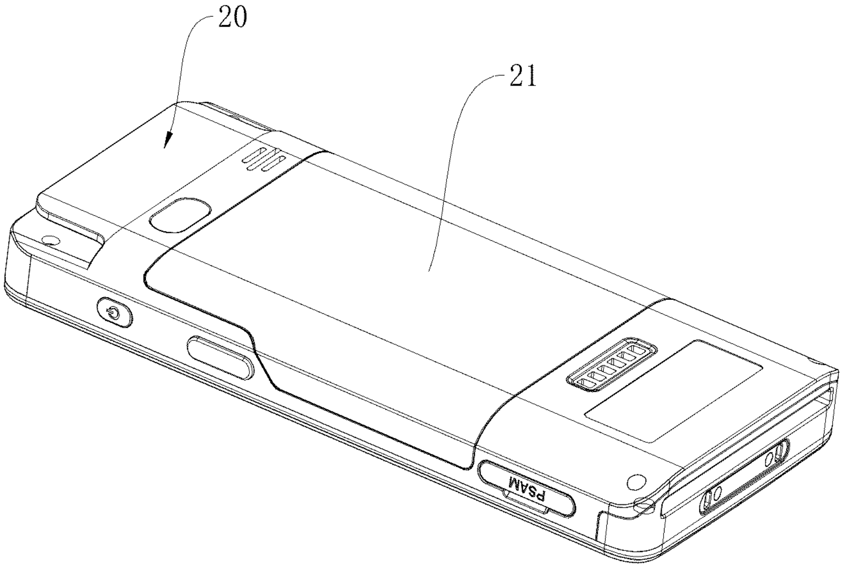
FIG. 4 is a schematic structural diagram of a handheld device provided by a specific embodiment of the present application.

In some embodiments, as shown in FIG. 3, the length of the two second antenna bases 12 along the length direction of the handheld device 20 is smaller than the length of the first antenna base 11 along the length direction of the handheld device 20. When the length of the first antenna base 11 is long, setting the length of the second antenna base 12 to be the same as the length of the first antenna base 11 will affect the layout of the function keys and volume-up/down keys on the side of the handheld device 20. And after the length of the second antenna base 12 increases to a critical value, continuing to increase the length of the second antenna base 12 will have little benefit on enhancing the antenna signal. Therefore, in actual applications, the length can be determined according to the actual required antenna signal strength. The length of the second antenna bases 12 is set to be smaller than the length of the first antenna base 11, and the length of the second antenna bases 12 is reasonably selected so as not to change the button layout of the original handheld device 20.

In some embodiments, the length of one second antenna base 12 along the length direction of the handheld device 20 is greater than or equal to the length of the first antenna base 11 along the length direction of the handheld device 20, and the other second antenna base 12 has a length along the length direction of the handheld device 20 that is smaller than the length of the first antenna base 11 along the length direction of the handheld device 20. Currently, most handheld devices 20 are only provided with function keys and volume keys on one side. Without changing the key layout of the original handheld device 20, when it is necessary to increase the length of the second antenna base 12, the handheld device 20 can have one second antenna base 12 on the side without buttons with a length greater than or equal to the length of the first antenna base 11, and the length of the second antenna base 12 on the side of the handheld device 20 with buttons is set to be less than the length of the first antenna base 11. That is, only increasing the length of the second antenna base 12 on one side, in order to enhance the antenna signal, without changing the key settings of the original handheld device 20.

In some embodiments, the widths of the two second antenna bases 12 along the thickness direction of the handheld device 20 are respectively greater than 60% of the thickness of the handheld device 20. The thickness direction of the handheld device 20 is the up and down direction in FIG. 1, and the second antenna base 12 extends from the first antenna base 11 installed on the backside of the handheld device 20 to the side of the handheld device 20. If the far ends of the second antenna bases 12 away from the first antenna base 11 are too far away from the frontside of the handheld device 20, the NFC antenna signals on the sides of the handheld device 20 sensed by an NFC card located at the frontside of the handheld device 20 might be too weak, which might cause unsuccessful swiping of an NFC card at the frontside of the handheld device 20. So, when configuring the second antenna bases 12, the width of the second antenna bases 12 along the thickness direction of the handheld device 20 needs to be more than 60% of the thickness of the handheld device 20. For example, it can be 65%, 70%, 75%, 80%, 90%, etc. of the thickness of the handheld device 20. And the thicker the handheld device 20 is, the greater the width of the second antenna bases 12 should be.

In some embodiments, the distance between the projections of the second antenna bases 12 on the frontside of the handheld device 20 and the screen assembly along the width direction of the handheld device 20 is greater than 1 mm. Because the screen assembly may shield the antenna signal, the second antenna bases 12 should not be too close to the screen assembly. Instead, it needs to have a certain distance from the side of the screen assembly to ensure that the second antenna bases 12 are less interfered by the screen assembly. The NFC card is placed at the frontside of the handheld device 20 and can successfully sense the NFC antenna signals at the sides of the handheld device 20.

In some embodiments, the first antenna base 11 includes a ferrite layer and a first flexible circuit layer. The ferrite layer and the first flexible circuit layer are stacked. Each second antenna base 12 is composed of a second flexible circuit layer. The coils on the second flexible circuit layers are connected with a coil or coils on the first flexible circuit layer to form a complete coupling coil 13. The structure of the coupling coil 13 is shown in FIG. 2.

The coil or coils on the first flexible circuit layer are connected with the coils on the second flexible circuit layers to form a complete coil of the NFC antenna. That is, an NFC antenna is provided on the handheld device 20 and the NFC antenna is extended to the sides of the handheld device 20. This makes it possible to swipe NFC cards on both the frontside and backside of the handheld device 20. There is no need to respectively set an NFC antenna each on the frontside and backside of the handheld device 20 to achieve card swiping on the frontside and backside. It does not occupy the space at the frontside of the handheld device 20. And the cost of providing one NFC antenna is less than the cost of setting up two NFC antennas.

In this embodiment, the ferrite layer is only provided on the first flexible circuit layer, so a ferrite layer is not provided on the second flexible circuit layer. Firstly, because ferrite is relatively brittle, so if a ferrite layer is also configured on the second flexible circuit layers, the ferrite layer at the bending regions of the second antenna bases 12 tend to break, thus the second antenna bases 12 are difficult to come into form. Secondly, because the electronic components inside the handheld device 20 inflict relatively more electromagnetic interference to the first antenna base 11 located directly above the electronic components, and the electromagnetic interference from the electronic components to the second antenna bases 12 located on the sides of the handheld device 20 is relatively small. Therefore, only the area of the first antenna base 11 needs to be provided with a ferrite layer to shield the electromagnetic interference of the electronic components on the NFC antenna. There is no need to provide a ferrite layer in the area of the second antenna bases 12, which facilitates the forming of the NFC antenna as well as saves manufacturing costs.

The application also provides a specific embodiment of a handheld device. As shown in FIGS. 1 to 4, the handheld device 20 includes a screen assembly, a middle frame 22, a battery 23, a back cover 21, and an NFC antenna for handheld devices according to any of the above embodiments. The screen assembly is arranged at the frontside of the middle frame 22, and the battery 23 is arranged at the backside of the middle frame 22, and the NFC antenna is attached to the inside of the back cover 21, and the back cover 21 is covered onto the battery 23. The shape of the back cover 21 is similar to the shape of the NFC antenna. Both sides of the back cover 21 in the width direction of the handheld device 20 are also bent toward the sides of the handheld device 20 so that the back cover 21 can cover the NFC antenna. The first antenna base 11 of the NFC antenna is provided with two feed points, and the handheld device 20 also has two feed terminals. After the back cover 21 is installed onto the handheld device 20, the feed points are connected to the feed terminals, achieving the electrical connection between the NFC antenna and the main board of the handheld device 20.

By arranging an NFC antenna on the handheld device 20 covering the sides of the handheld device, one antenna can be used to support NFC card reading at both the frontside and backside of the handheld device 20, which does not occupy any space at the frontside of the handheld device 20, and also reduces the cost of the antenna.

The above are only the preferred embodiments of the present application. It should be pointed out that those skilled in the art can make several improvements and modifications without departing from the principles of the present application. These improvements and modifications should also be considered as within the protection scope of this application.

The invention claimed is:

1. An NFC antenna for a handheld device, characterized by including:

an antenna base, and, a coupling coil;

wherein, the coupling coil is arranged along an edge of the antenna base, and the antenna base integrally includes:

a first antenna base, and, two second antenna bases;

wherein, the first antenna base is configured to be arranged on a backside of the handheld device, and two sides of the first antenna base in a width direction of the handheld device are respectively bent and extended towards a frontside of the handheld device to form the two second antenna bases, and the two second antenna bases are respectively located on sides of the handheld device and outside a screen assembly of the handheld device; and wherein widths of the two second antenna bases along a thickness direction of the handheld device are respectively greater than 60% of a thickness of the handheld device.

2. The NFC antenna for a handheld device according to claim 1, characterized in that:

a length or lengths of the two second antenna bases along a length direction of the handheld device are greater than or equal to a length of the first antenna base along the length direction of the handheld device.

3. The NFC antenna for a handheld device according to claim 1, characterized in that:

a length or lengths of the two second antenna bases along a length direction of the handheld device are smaller than a length of the first antenna base along the length direction of the handheld device.

4. The NFC antenna for a handheld device according to claim 1, characterized in that:

a length of one second antenna base along a length direction of the handheld device is greater than or equal to a length of the first antenna base along the length direction of the handheld device, and, a length of the other second antenna base along the length direction of the handheld device is less than the length of the first antenna base along the length direction of the handheld device.

5. The NFC antenna for a handheld device according to claim 1, characterized in that:

a distance between a projection of a second antenna base on the frontside of the handheld device and the screen assembly along a width direction of the handheld device is greater than 1 mm.

6. The NFC antenna for a handheld device according to claim 1, characterized in that:

the first antenna base includes a ferrite layer and a first flexible circuit layer, and the ferrite layer and the first flexible circuit layer are stacked; and, the second antenna bases are each composed of a second flexible circuit layer, and coils on the second flexible circuit layers are connected to a coil on the first flexible circuit layer to form the coupling coil.

7. A handheld device, characterized by comprising, an NFC antenna for a handheld device according to claim 1.

8. The handheld device according to claim 7, further comprising:

a back cover, wherein, at the sides of the handheld device in a width direction of the handheld device, the back cover is bent towards the sides of the handheld device to cover the NFC antenna.

9. The handheld device according to claim 8, further comprising:

a battery, and, the NFC antenna is disposed between the battery and the back cover.

10. The handheld device according to claim 7, characterized in that:

a length or lengths of the two second antenna bases along a length direction of the handheld device are greater than or equal to a length of the first antenna base along the length direction of the handheld device.

11. The handheld device according to claim 7, characterized in that:

a length or lengths of the two second antenna bases along a length direction of the handheld device are smaller than a length of the first antenna base along the length direction of the handheld device.

12. The handheld device according to claim 7, characterized in that:

a length of one second antenna base along a length direction of the handheld device is greater than or equal to a length of the first antenna base along the length direction of the handheld device, and, a length of the other second antenna base along the length direction of the handheld device is less than the length of the first antenna base along the length direction of the handheld device.

13. The handheld device according to claim 7, characterized in that:

a distance between a projection of a second antenna base on the frontside of the handheld device and the screen assembly along a width direction of the handheld device is greater than 1 mm.

14. The handheld device according to claim 7, characterized in that:

the first antenna base includes a ferrite layer and a first flexible circuit layer, and the ferrite layer and the first flexible circuit layer are stacked; and, the second antenna bases are each composed of a second flexible circuit layer, and coils on the second flexible circuit layers are connected to a coil on the first flexible circuit layer to form the coupling coil.

* * * * *